United States Patent [19]

Utsunomiya

[11] Patent Number: 4,557,150
[45] Date of Patent: Dec. 10, 1985

[54] LOAD CELL

[75] Inventor: Mitito Utsunomiya, Kusatsu, Japan

[73] Assignee: Kabushiki Kaisha Ishida Koki Seisakusho, Kyoto, Japan

[21] Appl. No.: 545,473

[22] Filed: Oct. 26, 1983

[30] Foreign Application Priority Data

Oct. 26, 1982 [JP] Japan .................. 57-187744
Oct. 26, 1982 [JP] Japan .................. 57-161840[U]
Nov. 10, 1982 [JP] Japan .................. 57-198259

[51] Int. Cl.$^4$ ............................. G01L 1/22
[52] U.S. Cl. .................. 73/862.65; 73/855; 338/2
[58] Field of Search .............. 73/855, 862.65; 338/2

[56] References Cited

U.S. PATENT DOCUMENTS

| | | | |
|---|---|---|---|
| 3,089,107 | 5/1963 | Dean, III | 338/2 |
| 3,639,875 | 2/1972 | Brewer | 338/2 |
| 3,863,192 | 1/1975 | Grey | 338/2 |
| 4,307,371 | 12/1981 | Ort | 338/2 |
| 4,343,197 | 8/1982 | Suzuki et al. | 73/862.65 |

FOREIGN PATENT DOCUMENTS

0018800  5/1971  Japan .................. 73/862.65

Primary Examiner—Charles A. Ruehl
Attorney, Agent, or Firm—Staas & Halsey

[57] ABSTRACT

The load-sensitive element of a load cell is provided with reduced-thickness portions for endowing the cell with flexibility, and a strain gauge is bonded to each reduced-thickness portion. A deposited aluminum tape or a deposited aluminum film, comprising a substrate and a deposited aluminum layer provided on the substrate, is bonded over each strain gauge by using an adhesive, thereby covering each strain gauge with a deposited aluminum layer. Alternatively, each strain gauge is covered with aluminum foil or a deposited aluminum film bonded in place through the intermediary of a rubber sheet interposed between the load-sensitive element and the foil or film, a space being provided around the strain gauge. Furthermore, the strain gauge is covered by a Teflon sheet non-adhesively, and further, a covering member such as a deposited aluminum film or tape covers the strain gauge from the top of the Teflon sheet.

8 Claims, 26 Drawing Figures

LOAD CELL

BACKGROUND OF THE INVENTION

This invention relates to a load cell used primarily in scales, and seeks to enhance load cell durability.

A load cell of the aforementioned type comprises a load-sensitive element which develops strain the magnitude of which corresponds to an applied load, and a strain gauge cemented to the load-sensitive element to detect the amount of strain electrically. It is necessary to protect the strain gauge against moisture and humidity in order to enhance its durability and maintain good operating performance. Conventional practice has been to either coat the strain gauge with a moistureproof material such as silicone rubber, or seal the strain gauge by means of a metal foil. However, the former technique does not provide sufficient protection against moisture in the moist and humid environments where load cells commonly find use in scales. While the latter expedient affords excellent protection against moisture, the metal foil has little stretchability and therefore hinders the deformation of the load-sensitive element, thereby having an adverse effect upon the load - strain characteristic of the load-sensitive element.

SUMMARY OF THE INVENTION

An object of the present invention is to improve the durability of a load cell by effectively protecting a strain gauge against water and moisture without adversely affecting the load - strain characteristic of a load-sensitive element.

Another object of the present invention is to improve the durability of a load cell without inviting any decline in the accuracy thereof, this being accomplished by subjecting a strain gauge to a moistureproofing treatment without hampering the function of the strain gauge.

A further object of the present invention is to effectively protect a strain gauge against moisture and humidity, wherein any adverse effect upon the load-strain characteristic of a load-sensitive element is precluded, even if the strain gauge is covered with aluminum foil or the like, by the stretching action of a rubber sheet bonded directly over the strain gauge or by providing a space around the strain gauge, so that the creep characteristic of the load cell is unaffected.

According to the present invention, the foregoing objects are attained by providing a load cell the load-sensitive element of which is formed to include portions of reduced thickness each of which has a strain gauge affixed thereto. Since each strain gauge is an extremely thin film having a thickness of from ten and some odd angstroms to at most several thousand angstroms, each is covered with a uniform, non-porous aluminum deposited layer exhibiting excellent flexibility and elasticity.

In another aspect of the invention, each strain gauge affixed to the load-sensitive element of the load cell is covered non-adhesively with a Teflon sheet ("Teflon" is the trademark for polytetrafluoroethylene) which is difficult to bond chemically, and the Teflon sheet is in turn covered with a suitable covering member.

In still another aspect of the invention, a strain gauge, which is affixed to each of plural flexible portions formed on upper and lower beams of the load-sensitive element constituting the load cell, is covered with aluminum foil or a deposited aluminum film bonded in place through the intermediary of a rubber sheet interposed between the load-sensitive element and the foil or film, with a space being provided around the strain gauge.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

In the description that follows, a film obtained by providing one surface of a film substrate with a layer of deposited aluminum will be referred to as a "deposited aluminum film", while a film obtained by coating this deposited aluminum film beforehand with an adhesive will be referred to as a "deposited aluminum tape"'.

Figure 1:
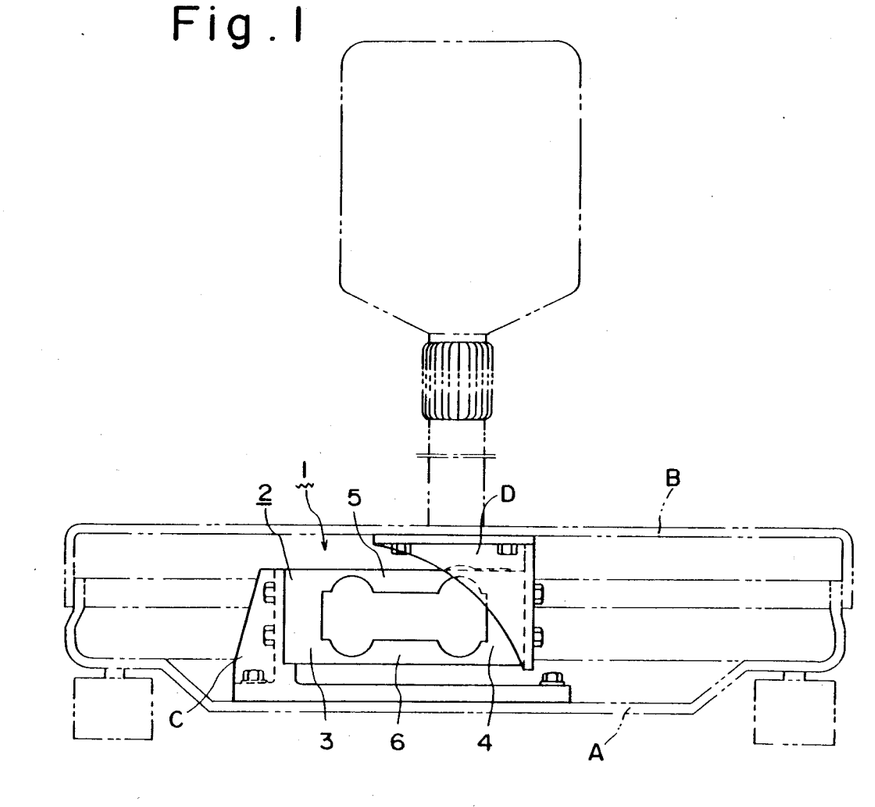
FIG. 1 is a front view illustrating the condition in which a load cell according to the present invention is used.
Figure 2:
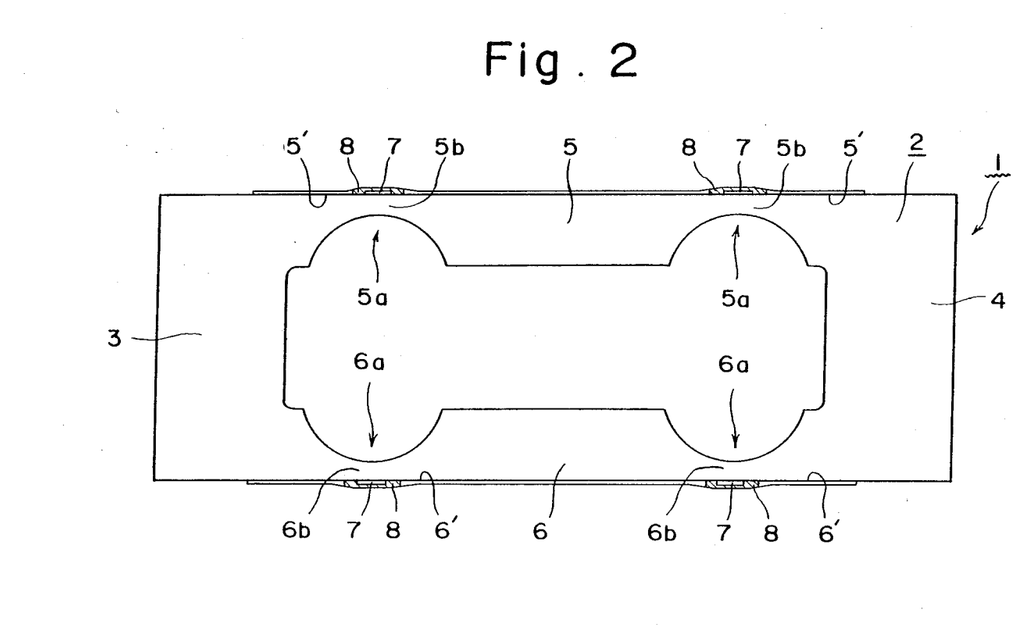
FIG. 2 is a front view illustrating a first embodiment of a load cell according to the present invention.

In FIG. 1, numeral 1 denotes a load cell mounted by brackets C, D between a scale body A and a weighing platform B provided thereon. A load-sensitive element 2 constitutes the main body of the load cell 1 and is the element which develops strain when subjected to an applied load. As shown in FIG. 2, the load-sensitive element 2 has a hollow, quadrilateral configuration and comprises a rigid, fixed portion 3 at one extremity of the quadrilateral which is fixedly secured to the scale body A by the bracket C, a rigid, movable portion 4 at the other extremity of the quadrilateral to which the weighing platform B is affixed by the bracket D, and upper and lower beams 5, 6 interconnecting the upper and lower ends, respectively, of the rigid portions 3, 4. The upper beam 5 is provided at two locations with flexible portions 5b formed by reducing the thickness of the beam by the formation of semicircular cut-outs 5a on the inner side thereof. Likewise, the lower beam 6 is provided at two locations with flexible portions 6b formed by reducing the thickness of the beam by the formation of semicircular cut-outs 6a on the inner side thereof. A strain gauge 7 is bonded to the outer surface of each flexible portion.

Figures 3, 3A:
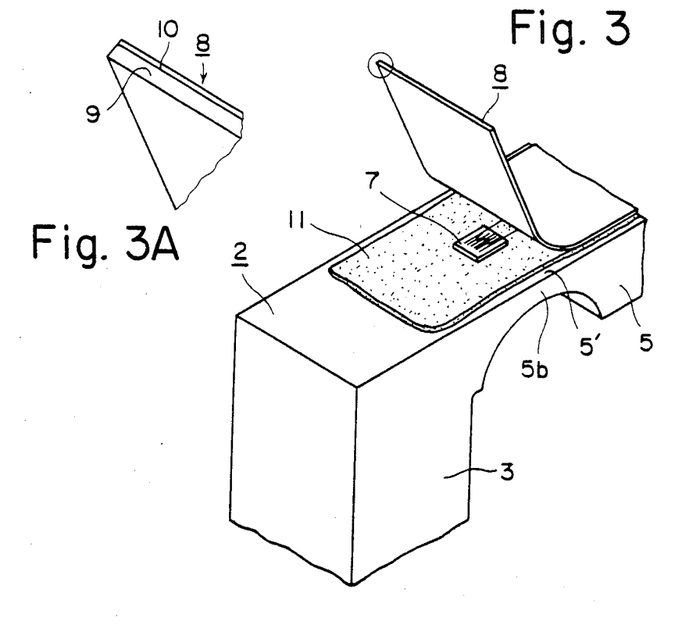
FIG. 3 is a partial perspective view showing a process for manufacturing the load cell of the first embodiment of the present invention and FIG. 3A is an exploded view thereof.
Figure 4:
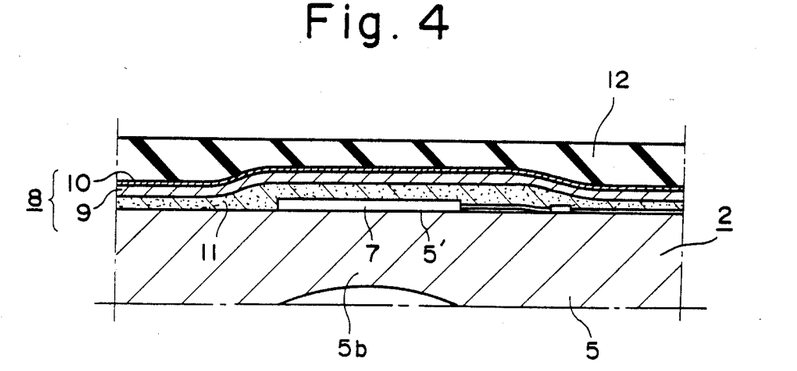
FIG. 4 is an enlarged, longitudinal sectional view, seen from the front, illustrating a principal portion of the load cell of the first embodiment of the present invention.

The upper and lower beams 5, 6 have respective bonding surfaces 5', 6' to which the strain gauges 7 are bonded. A deposited aluminum film 8 is bonded to each of these surfaces 5', 6' so as to cover the respective strain gauge 7. As shown in FIGS. 3 and 4, the film 8 comprises a film substrate 9 made of polyester or the like, and a non-porous deposited aluminum layer 10 formed on one suface of the film substrate 9 by a vapor deposition technique. This deposited aluminum film 8 is bonded to each of the bonding surfaces 5', 6' of the upper and lower beams 5, 6 through use of a polyurethane or like adhesive 11. After the deposited aluminum film 8 is bonded into position, the entirety of the load-sensitive element 2 may be coated with a silicone rubber layer 12, as shown in FIG. 4. This is accomplished by first subjecting the element to a primer treatment to improve the adherence of the silicone rubber layer thereto, and then dipping the element into a silicone rubber solution.

When an article to be weighed is placed on the weighing platform B of the scale shown in FIG. 1, the movable portion 4 of the load-sensitive element 2 constituting the load cell 1 is displaced downwardly owing to the applied load. With such downward displacement, the surfaces at which the strain gauges 7 are bonded to the flexible portions 5b, 6b of the upper and lower beams 5, 6 experience either tension or compression, which is in turn transmitted to the respective strain gauges. The result is a change in the electrical resistance of each strain gauge. Thus, the amount of strain developed by the load-sensitive element 2, which strain corresponds to the weight of the article on the weighing platform, may be detected through electrical means.

As described above, the deposited aluminum film 8 is bonded over the strain gauges 7, so that each strain gauge is covered by the non-porous deposited aluminum layer 10 of the film 8. Owing to the waterproof and moistureproof properties of the deposited aluminum layer 10, protection of the strain gauges against moisture and humidity is assured even if the scale is employed in an extremely wet or humid environment. Since the substrate 9 and deposited aluminum layer 10 of the film 8 exhibit sufficient flexibility and elasticity, the film 8 will not impede the deformation of the load-sensitive element 2 when a load is applied thereto.

Figures 5, 5A:
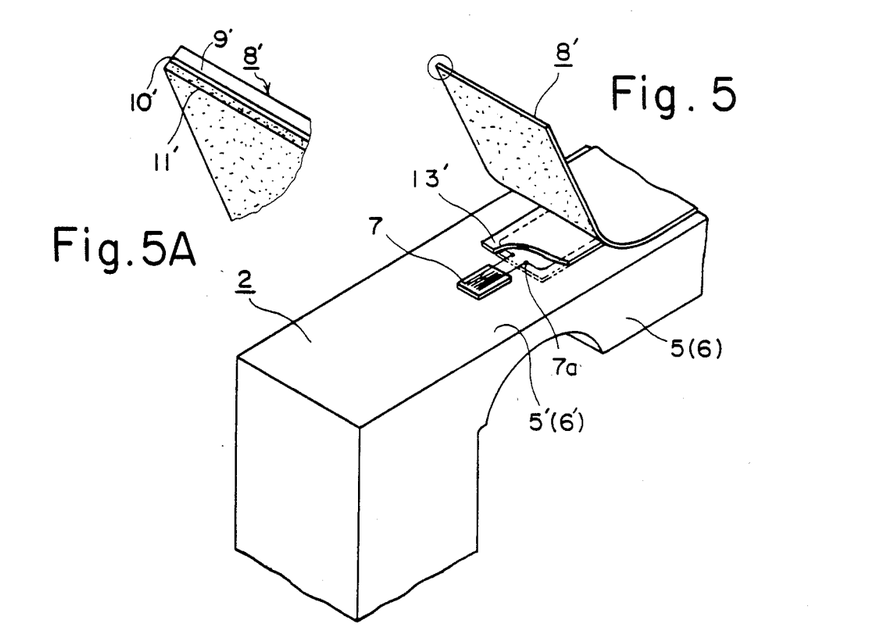
FIG. 5 is a partial perspective view showing a process for manufacturing a load cell of a second embodiment of the present invention and FIG. 5A is an exploded view thereof.
Figure 6:
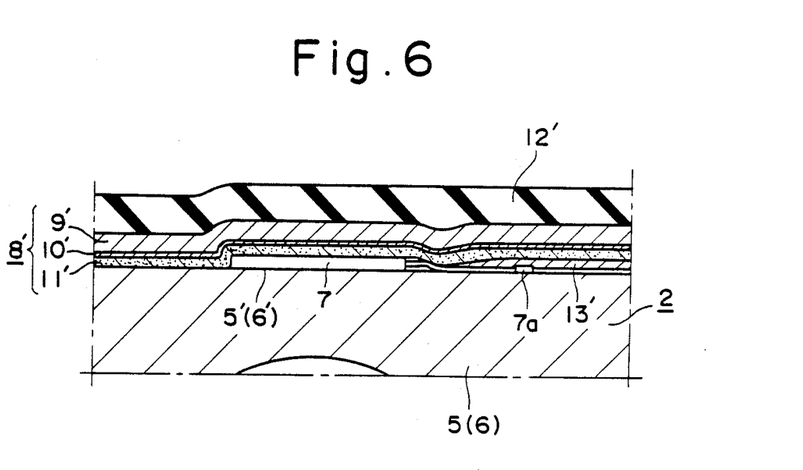
FIG. 6 is an enlarged, longitudinal sectional view, seen from the front, illustrating a principal portion of the load cell of the second embodiment of the present invention.

Reference will now be had to Figs. 5 and 6 to describe a second embodiment of the present invention. In this embodiment, the deposited aluminum film 8 of the first embodiment is replaced by a deposited aluminum tape 8'. The tape 8' comprises a substrate 9' made of polyester or the like, and a deposited aluminum layer 10' provided on one surface of the substrate 9'. Further, an acrylic or like adhesive 11' is applied in advance to the exposed surface of the deposited aluminum layer 10', namely to the side thereof opposite the substrate 9'.

According to this embodiment of the invention, the deposited aluminum tape 8' is bonded directly, by virtue of the adhesive 11', to the strain gauge bonding surfaces 5', 6' on the beams 5, 6 of the load-sensitive element 2. This makes it possible to dispense with the operation of applying the adhesive 11 to the load-sensitive element 2 of the first embodiment, as illustrated in FIGS. 3 and 4. In the second embodiment of FIGS. 5 and 6, a Kapton adhesive tape 13' ("Kapton" is a trademark, it is manufactured by duPont) is applied to the electrically exposed connections 7a of the strain gauge 7 for the purpose of insulating the connections from the deposited aluminum layer 10', which is electrically conductive.

Figure 7:
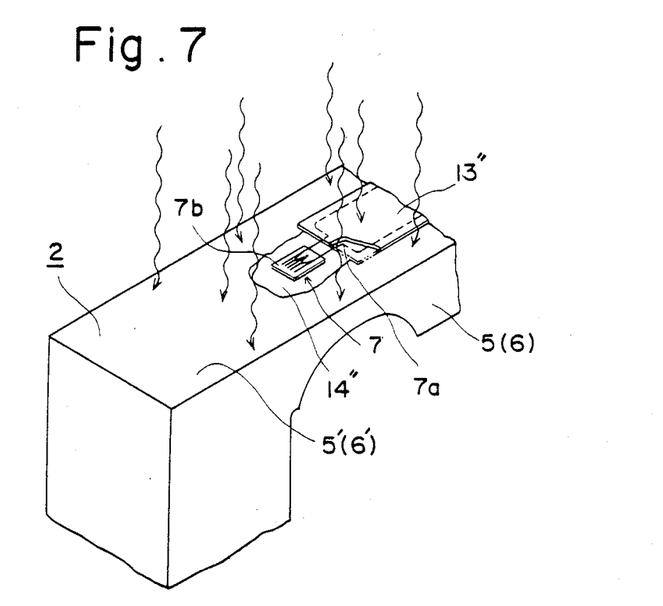
FIG. 7 is a partial perspective view showing a process for manufacturing a load cell of a third embodiment of the present invention.
Figure 8:
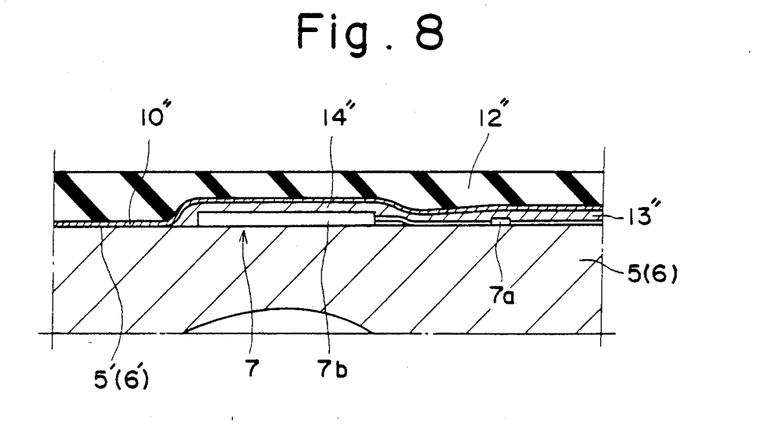
FIG. 8 is an enlarged, longitudinal sectional view, seen from the front, illustrating a principal portion of the load cell of the third embodiment of the present invention.

A third embodiment of the invention is illustrated in FIGS. 7 and 8. After the strain gauge 7 is bonded to the beam 5 of the load-sensitive element 2, the strain gauge bonding surface 5' is subjected to an aluminum vapor deposition treatment to coat the strain gauge 7 with a deposited aluminum layer 10". In accordance with this embodiment, the layers consisting of the film substrate 9 and adhesive 11 or 11' of the first and second embodiments are not interposed between the bonding surface 5' of the load-sensitive element 2 and the deposited aluminum layer 10". Instead, the strain gauge 7 is directly coated with the deposited aluminum layer 10" to improve the adherence between the layer 10" and both the strain gauge and strain gauge bonding surface. This provides the strain gauge 7 with even greater protection against moisture and humidity. In order to insulate the connections 7a of the strain gauge 7 from the deposited aluminum layer 10", a strip of Kapton adhesive tape 13" is applied to these connections. It is also necessary to prevent aluminum molecules from penetrating a paper covering the grid 7b of the strain gauge 7. To this end, a polyurethane coating 14" is applied to the grid 7b before carrying out the aluminum deposition treatment.

Figure 9:
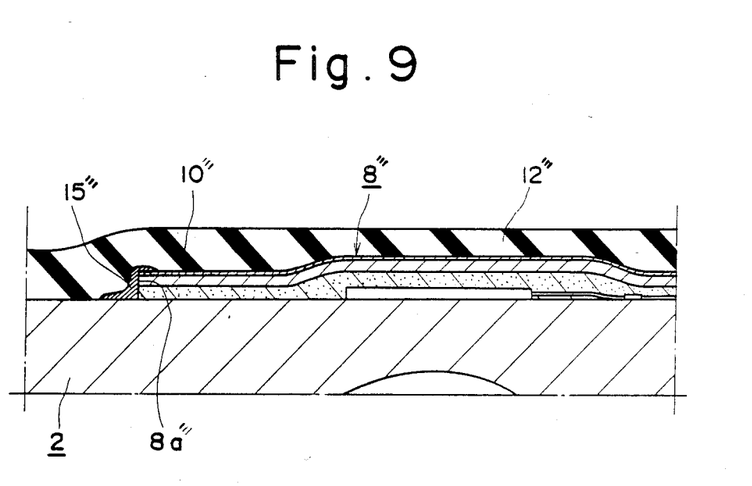
FIG. 9 is an enlarged, longitudinal sectional view, seen from the front, illustrating a principal portion of the load cell of a fourth embodiment of the present invention.

FIG. 9 illustrates a fourth embodiment of the present invention. In the first embodiment of FIGS. 2 through 4 and the second embodiment of FIGS. 5 and 6, a discontinuous or step-like portion susceptible to the penetration of humidity is formed where the deposited aluminum layer 10 (10') meets the surface of the load-sensitive element 2 along the edge of the deposited aluminum film 8 or deposited aluminum tape 8'. This embodiment seeks to improve upon the foregoing arrangement by forming a deposited aluminum layer 15''' extending from the edge portion 8a''' of the deposited aluminum film (or deposited aluminum tape) 8''' to the surface of the load-sensitive element 2. The layer 15''' is formed by an aluminum vapor deposition treatment. The deposited aluminum layer 15''' closes off the portion of discontinuity between the aluminum deposited layer 10''' and the surface of the load-sensitive element 2.

It should be noted that the entirety of the load-sensitive element 2 in the second, third and fourth embodiments of FIGS. 6, 8 and 9 may be coated with a silicone rubber layer 12', 12'', 12''', respectively, as described earlier in connection with the first embodiment shown in FIG. 4.

Thus, in accordance with the first through fourth embodiments of the present invention, a strain gauge bonded to the flexible portion of a load-sensitive element constituting a load cell is covered with a deposited aluminum layer. The strain gauge is therefore protected against moisture and humidity without any deleterious effect upon the load-strain characteristic of the load-sensitive element. The latter obtains from the fact that the covering body offers little restraint to the deformation of the load-sensitive element. The result is a load cell having excellent performance and durability and, hence, a load cell suited for use in scales employed in extremely moist or humid environments.

A fifth embodiment of the present invention will now be described with reference to FIGS. 10 and 11. As shown, the strain gauge 7 is covered with a Teflon sheet 16, which is in turn coated completely, by a process such as painting or dipping, with a covering member 17 such as silicone rubber, butyl or polyurethane. Thus, the Teflon sheet 16 is merely laid upon the strain gauge 7 non-adhesively, that is, without the use of an adhesive, and is fixed to the surface of the load-sensitive element 2 by the covering member 17 applied thereto.

Figure 10:
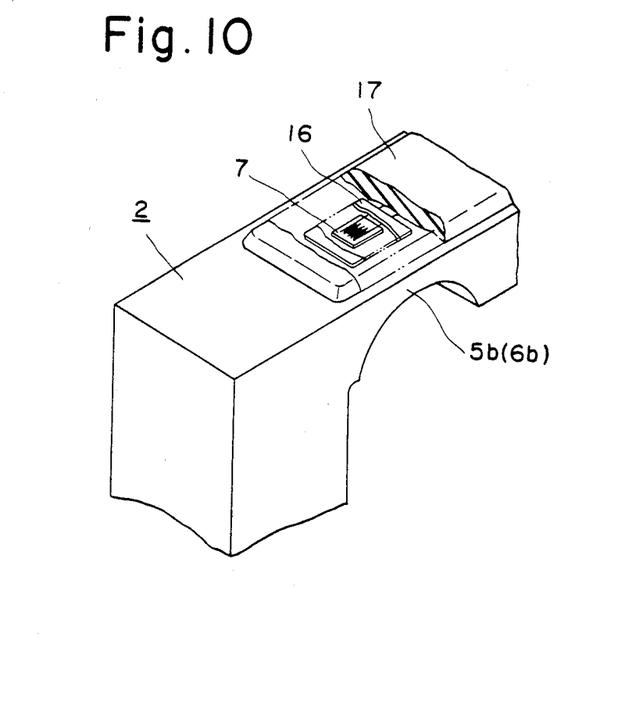
FIG. 10 is a perspective view illustrating a principal portion of a load cell of a fifth embodiment of the present invention.
Figure 11:
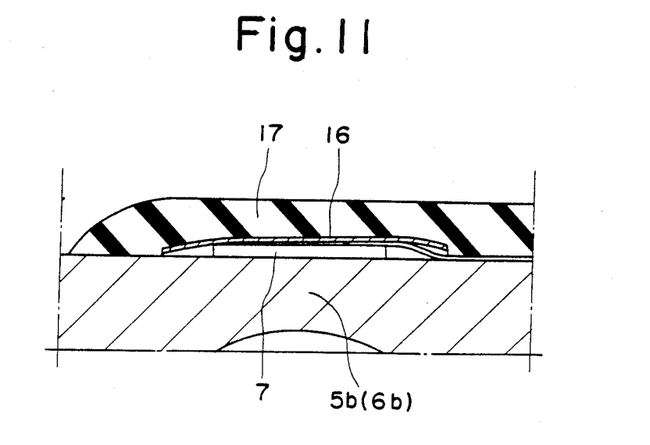
FIG. 11 is an enlarged sectional view illustrating a principal portion of the fifth embodiment of the present invention.

According to the arrangement of FIGS. 10 and 11, the strain gauge 7 bonded to the surface of the load-sensitive element 2 at the flexible portion 5b (6b) is protected against moisture and humidity by the covering member 17. The Teflon sheet 16 is interposed between the strain gauge 7 and the covering member 17, without being adhered to the strain gauge, so that the strain gauge 7 is bonded solely to the load-sensitive element 2.

When an article to be weighed is placed on the weighing platform B of the scale shown in FIG. 1, the movable portion 4 of the load-sensitive element 2 is displaced downwardly owing to the applied load. With such downward displacement, the surfaces at which the strain gauges 7 are bonded to the flexible portions 5b, 6b of the upper and lower beams 5, 6 experience either tension or compression. The strain gauges 7 bonded to these surfaces are in no way constrained or restricted by the covering member 17, so that the strain gauges are free to stretch and relax and, hence, follow up the tension and compression of the flexible portions 5b, 6b in a faithful manner. Thus, the amount of strain developed by the load-sensitive element 2, namely the weight of the article on the weighing platform B, may be detected with great accuracy in the form of an electrical output from the strain gauges.

Figures 12, 12A:
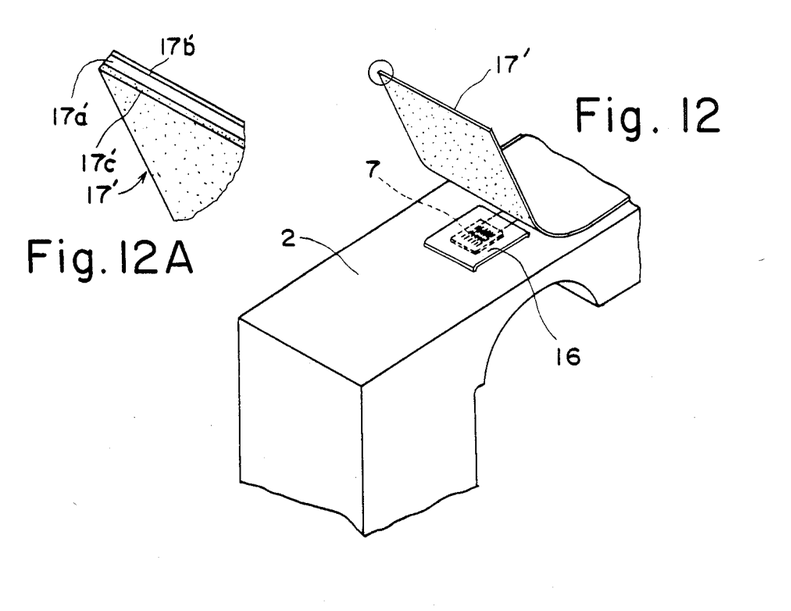
FIGS. 12, 13 and 14 are perspective views illustrating a principal portion of sixth, seventh and eighth embodiments of a load cell according to the present invention
FIGS. 12A, 13A and 14A are exploded views thereof.
Figures 13, 13A:
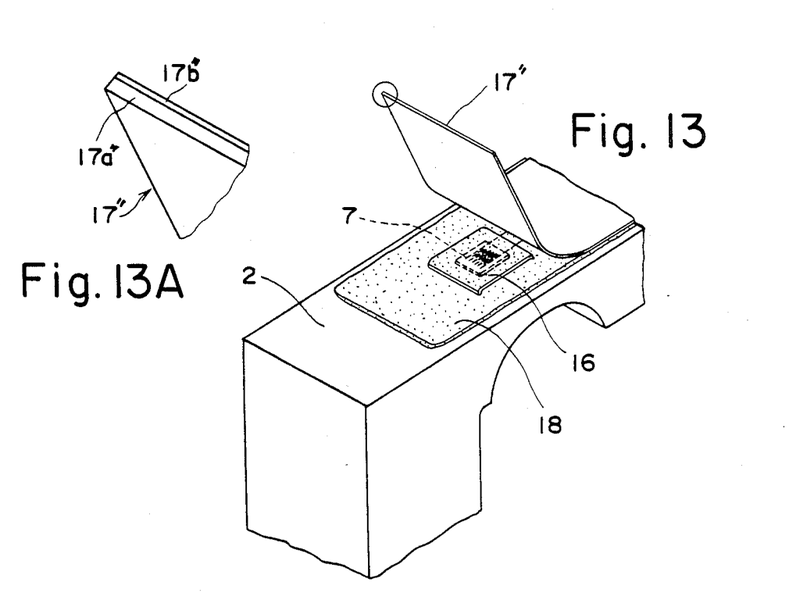
Figures 14, 14A:
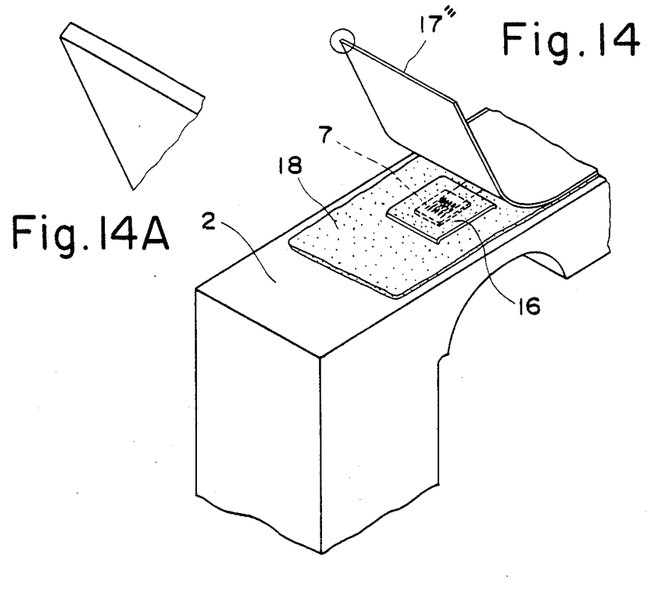

Sixth, seventh and eighth embodiments of the present invention are illustrated in FIGS. 12, 13 and 14, respectively. In the sixth embodiment of FIG. 12, a deposited aluminum tape 17' is used in place of the coating of silicone rubber or the like used as the covering member in the fifth embodiment described above. The deposited aluminum tape 17' comprises a substrate 17a' made of polyester or the like, and a deposited aluminum layer 17b' provided on one surface of the substrate 17a'. Further, an acrylic or like adhesive 17c' is applied in advance to the opposite side of the substrate 17a'. After each strain gauge 7 bonded to the surface of the load-sensitive element 2 at the flexible portions thereof is covered non-adhesively with the Teflon sheet 16, the foregoing deposited aluminum tape 17' is applied thereto and bonded to the surface of the load-sensitive element. It should be noted that the deposited aluminum tape 17' may be substituted by a deposited aluminum tape comprising the substrate 17a', the deposited aluminum layer 17b' provided on one surface of the substrate 17a, and the adhesive 17c' applied in advance to the exposed surface of the deposited aluminum layer 17b', rather than to the surface of the substrate 17a' opposite the deposited aluminum layer 17b'.

In the seventh embodiment of FIG. 13, a deposited aluminum film 17'' is employed as the covering member. The deposited aluminum film 17'' comprises a substrate 17a'', and a deposited aluminum layer 17b'' provided on one surface of the substrate 17a''. The strain gauge 7 is covered non-adhesively with the Teflon sheet 16, the upper surface and periphery whereof are coated with an adhesive 18. The deposited aluminum film 17'' is bonded to the adhesive 18.

In the eighth embodiment of FIG. 14, aluminum foil 17''' is used as the covering member. As in the seventh embodiment of FIG. 13, the strain gauge 7 is covered with the Teflon sheet 16, and the aluminum foil 17''' is bonded to the load-sensitive element 2 by the adhesive 18 so as to cover the Teflon sheet 16.

In each of the embodiments of FIGS. 12 through 14, the deposited aluminum layers 17b', 17b'', or the aluminum foil 17''' protect the strain gauge 7 against moisture and humidity. Like the embodiment shown in FIGS. 10 and 11, the Teflon sheet 8 is interposed between the strain gauge 7 and the covering member 17',17'',17''', allowing the strain gauge to follow up the deformation of the load-sensitive element 2 in a highly precise manner.

Thus, in accordance with the fifth through eighth embodiments of the present invention, a strain gauge bonded to the flexible portion of a load-sensitive element constituting a load cell is covered with a covering member through the intermediary of a Teflon sheet placed on the strain gauge but not adhered thereto. The strain gauge is therefore protected against moisture and humidity, and the covering material will not restrict or constrain the stretching and relaxation of the strain gauge as it follows up the deformation of the load-sensitive element. This provides a load cell which exhibits excellent performance and weighing accuracy, and which is suited for use in scales employed in extremely moist or humid environments.

Figure 15:
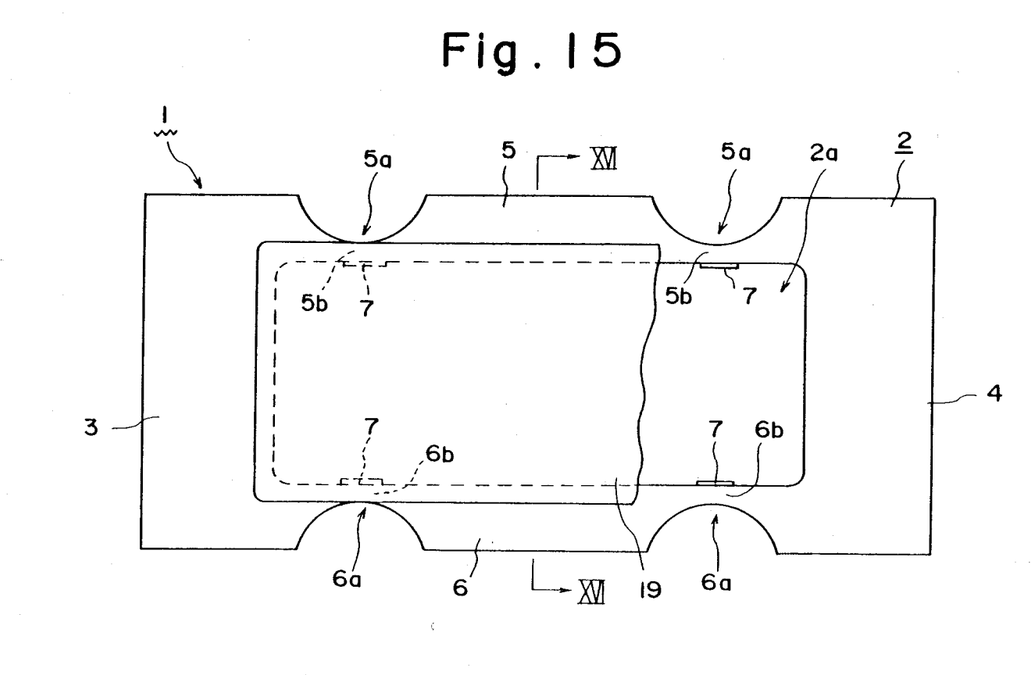
FIG. 15 is a front view illustrating a ninth embodiment of a load cell according to the present invention.
Figure 16:
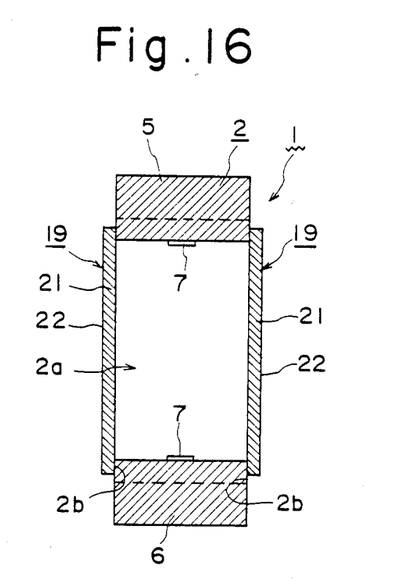
FIG. 16 is a longitudinal sectional view taken along line XVI—XVI of FIG. 15.
Figure 17:
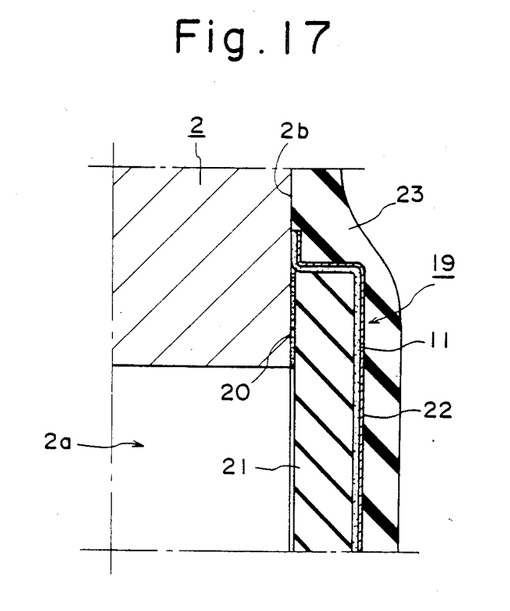
FIG. 17 is an enlarged view illustrating a principal portion of the load cell shown in FIG. 16.

Reference will now be had to FIGS. 15 through 17 to describe a ninth embodiment of the present invention.

As shown in FIG. 15, the load-sensitive element 2 has a hollow, quadrilateral configuration and comprises a rigid, fixed portion 3 at one extremity of the quadrilateral which is fixedly secured to the scale body A by the bracket C, a rigid, movable portion 4 at the other extremity of the quadrilateral to which the weighing platform B is affixed by the bracket D, and upper and lower beams 5, 6 interconnecting the upper and lower ends, respectively, of the rigid portions 3, 4. The upper beam 5 is provided at two locations with flexible portions 5b formed by reducing the thickness of the beam by the formation of semicircular cut-outs 5a. Likewise, the lower beam 6 is provided at two locations with flexible portions 6b formed by reducing the thickness of the beam by the formation of semicircular cut-outs 6a. The strain gauge 7 is bonded to the load-sensitive element 2 at each flexible portion thereof. In this embodiment of the invention, the cut-outs 5a, 6a are formed on the outer side of the upper and lower beams 5, 6, respectively. Accordingly, the strain gauges 7 are bonded to the inner sides of the upper and lower beams 5, 6, namely the sides facing the hollow portion 2a of the load-sensitive element 2, rather than to the outer sides thereof as in the embodiments described above. Numeral 19 denotes a covering body which, as shown in FIG. 16, is bonded to each side surface 2b of the load-sensitive element 2 so as to seal off the hollow portion 2a of the load-sensitive element. As shown in the enlarged view of FIG. 17, the covering body 19 comprises a rubber sheet 21 bonded to the side surface 2b of the load-sensitive element 2 through a sealant 20, and aluminum foil 22 bonded in place by the adhesive 11 so as to cover the rubber sheet 21 from the outside. Thus, the strain gauges 7 are covered while a space (the hollow portion 2a of the load-sensitive body 2) is provided around them. A silicone sealing material is suitable for use as the sealant 20, and an acrylic adhesive is suitable for use as the adhesive 11. A suitable material for use as the rubber sheet 21 is butyl rubber in view of the flexibility thereof. After the covering body 19 is bonded in place, the entirety of the load-sensitive element 2 may be coated with a silicone rubber layer 23, as shown in FIG. 17. This is accomplished by first subjecting the element to a primer treatment, and then dipping the element into a silicone rubber solution.

When an article to be weighed is placed on the weighing platform B of the scale shown in FIG. 1, the movable portion 4 of the load-sensitive element 2 constituting the load cell 1 is displaced downwardly owing to the applied load. With such downward displacement, the surfaces at which the strain gauges 7 are bonded to the flexible portions 5b, 6b of the upper and lower beams 5, 6 experience either tension or compression, which is in turn transmitted to the respective strain gauges. The result is a change in the electrical resistance of each strain gauge. Thus, owing to the stretching and relaxation of the strain gauges, the amount of strain developed by the load-sensitive element 2, which strain corresponds to the weight of the article on the weighing platform, may be detected through electrical means.

As described above, the strain gauges 7 of the load cell 1 are covered with the covering body 19, which comprises the rubber sheet 21 bonded to the side surface 2b of the load-sensitive element 2, and the aluminum foil 22. Owing to the waterproof and moistureproof properties of the aluminum foil 22, protection of the strain gauges against moisture and humidity is assured even if the scale is employed in an extremely wet or humid environment. Though the aluminum foil 22 lacks stretchability, deformation of the load-sensitive element 2 is in no way hampered because of the highly flexible rubber sheet 21 interposed between the foil 22 and the load-sensitive body 2. Further, since the strain gauges 7 are covered by means of the covering bodies 19 while the space 2a is provided around them, the covering bodies do not adversely affect the creep characteristic. Thus, the strain gauges 7 may stretch and relax in excellent conformance with the stetching and relaxation of the strain gauge bonding surfaces located at the flexible portions 5b, 6b of the load-sensitive element 2. With the arrangement of the invention, the strain gauges 7 can be protected against moisture and humidity without any deterioration in the load-strain characteristic of the load-sensitive element 2 or in the creep characteristic of the strain gauges being caused by a restraining forced imposed by the covering bodies 19.

Figures 18, 19:
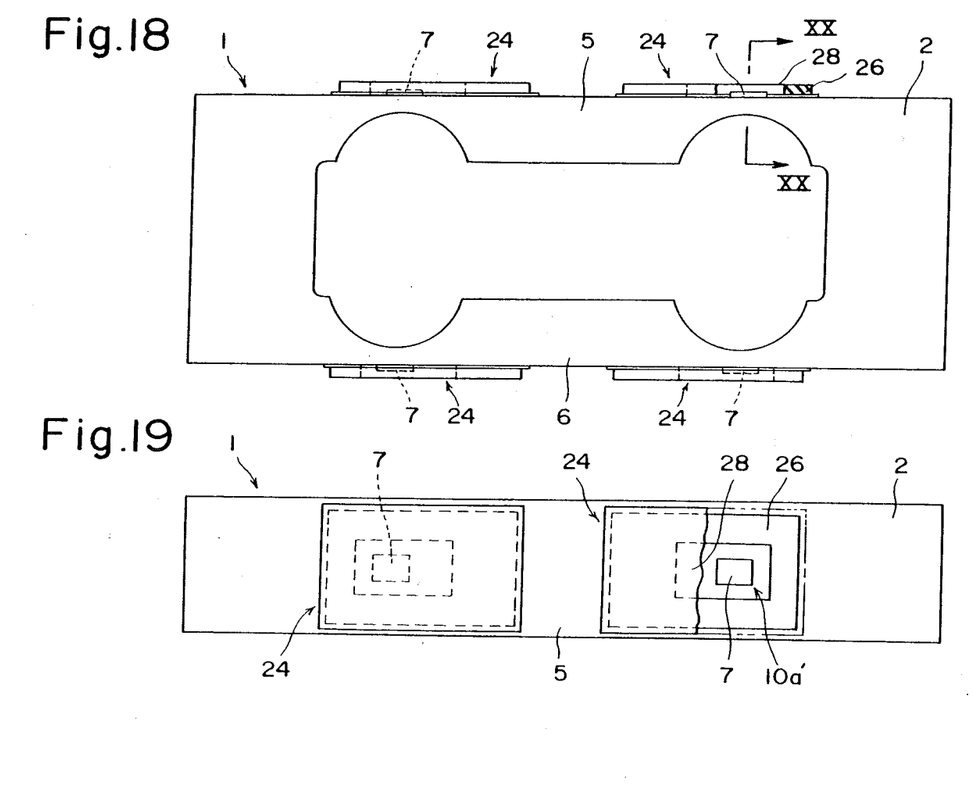
FIG. 18 is a front view illustrating a tenth embodiment of a load cell according to the present invention.
FIG. 19 is a plan view illustrating the load cell of FIG. 18.
Figure 20:
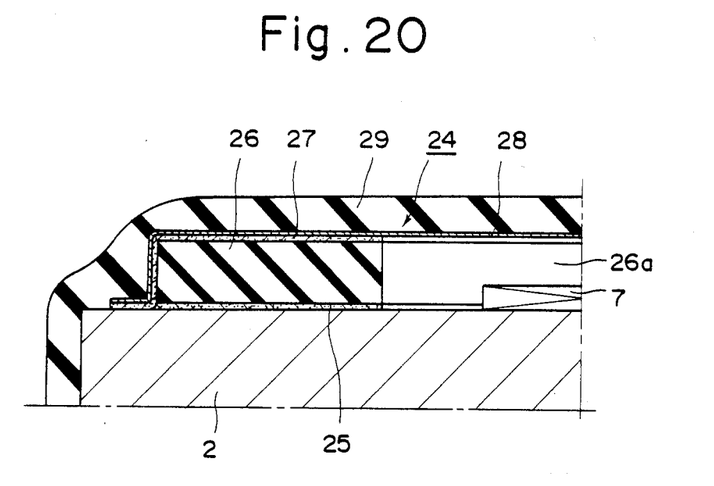
FIG. 20 is an enlarged sectional view taken along line XX—XX of FIG. 18.

A tenth embodiment of the present invention will now be described with reference to FIGS. 18 through 20. This embodiment relates to a load cell 1 having strain gauges 7 bonded to the outer sides of upper and lower beams 5, 6 of a load-sensitive element 2. Each strain gauge 7 is covered with a covering body 24. As shown in FIG. 20, each covering body 24 comprises a rubber sheet 26 bonded to the surface of the load-sensitive element 2 by a sealant 25, and aluminum foil 28 bonded in place by an adhesive 27 so as to cover the rubber sheet from the outside. The rubber sheet 26 has an opening 26a and is bonded to the load-sensitive element 2 in such a manner that the strain gauge 7 will be situated in said opening.

In the present embodiment, each strain gauge 7 is covered with the aluminum foil 28 bonded in place through the intermediary of the rubber sheet 26, which is interposed between the load-sensitive body 2 and the aluminum foil, a space (the hollow portion 10a') being provided around the strain gauges. Thus, as in the ninth embodiment, the strain gauges are protected against moisture and humidity without any adverse effect upon the load-strain characteristic of the load-sensitive body or the creep characteristic of the strain gauges. Also, the entirety of the load-sensitive element 2 may be coated with a silicone rubber layer 29, as shown in FIG. 20.

Figure 21:
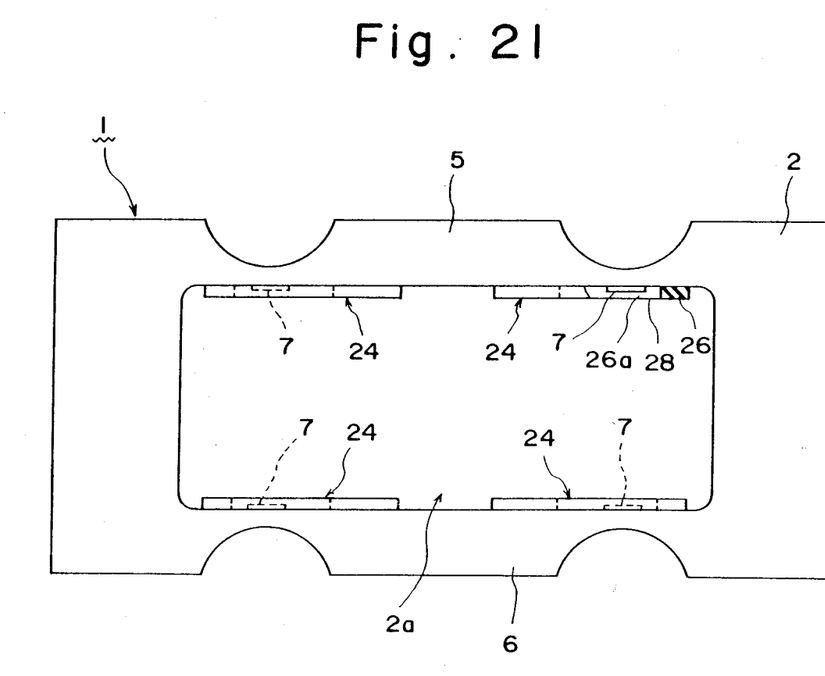
FIG. 21 is a front view illustrating an 11th embodiment of a load cell according to the present invention.

Reference will now be had to FIG. 21 to describe an 11th embodimeht of the present invention. This embodiment relates to a load cell 1 having strain gauges 7 bonded to the inner sides of upper and lower beams 5, 6 of a load-sensitive element 2, namely the sides of the beams facing the hollow portion 2a of the load-sensitive body 2. As in the tenth embodiment of FIGS. 18 through 20, each strain gauge 7 is covered with a covering body 24 which comprises a rubber sheet 26 bonded to the inner surface of the load-sensitive element 2 by a sealant, and aluminum foil 28 bonded in place by an adhesive so as to cover the rubber sheet from the outside. The rubber sheet 26 has an opening 26a and is bonded to the load-sensitive element 2 in such a manner that the strain gauge 7 will be situated in said opening.

In the present embodiment, each strain gauge 7 is covered with the aluminum foil 28 bonded in place through the intermediary of the rubber sheet 26, which is interposed between the load-sensitive body 2 and the aluminum foil, a space (the hollow portion 26a) being provided around the strain gauges. Thus, as in the foregoing embodiments, the strain gauges are protected against moisture and humidity without any adverse effect upon the load-strain characteristic of the load-sensitive body or the creep characteristic of the strain gauges. Also, the entirety of the load-sensitive element 2 may be coated with a silicone rubber layer.

It should be noted that the aluminum foils 22, 28 in the foregoing embodiments may be substituted by a deposited aluminum film comprising a substrate consisting primarily of polyester or the like, and a thin layer of aluminum formed on the surface of the substrate by vapor deposition.

Thus, in accordance with the present invention, a strain gauge is bonded to the flexible portions of the upper and lower beams of a load-sensitive element constituting a load cell, and each strain gauge is covered with aluminum foil or a deposited aluminum film bonded in place through the intermediary of a rubber sheet interposed between the load-sensitive element and the foil or film, a space being provided around the strain gauges. The strain gauges are thus effectively protected against moisture and humidity without any adverse effect upon the load-strain characteristic of the load-sensitive element or the creep characteristic of the strain gauges. The result is a load cell having excellent performance and durability and, hence, a load cell suited for use in scales employed in extremely moist or humid environments.

As many apparently widely different embodiments of the present invention can be made without departing from the spirit and scope thereof, it is to be understood that the invention is not limited to the specific embodiments thereof except as defined in the appended claims.

What we claim is:

1. A load cell comprising:
   a load-sensitive element having a portion reduced in thickness for providing flexibility;
   a strain gauge affixed to said reduced-thickness portion; and
   a tape covering said strain gauge without hindering its deformation;
   wherein said tape includes a tape substrate, an aluminum layer provided on a surface thereof, and a layer of adhesive on an exterior surface of the combination of said tape substrate and aluminum layer.

2. The load cell according to claim 1, said adhesive being provided on the surface of said tape substrate which is opposite the surface on which said aluminum layer is provided.

3. The load cell according to claim 1, wherein a deposited aluminum layer is formed on a leading edge portion of said tape in order to seal said leading edge portion.

4. The load cell of claim 1, said adhesive being provided on said aluminum layer.

5. The load cell of claim 1, comprising a non-adhesive layer of Teflon beneath said tape and over said strain gauge.

6. A load cell comprising:
   a load-sensitive element having a portion reduced in thickness for providing flexibility;
   a strain gauge affixed to said reduced-thickness portion;
   a Teflon sheet covering said strain gauge non-adhesively; and
   a covering member covering said Teflon sheet.

7. The load cell according to claim 6, wherein said covering member includes a film formed of a film substrate and a non-porous deposited aluminum layer thereon.

8. The load cell according to claim 6, wherein said covering member includes a tape formed of a tape substrate, a non-porous deposited aluminum layer on said tape substrate, and an adhesive on an exterior surface of one of said tape substrate and aluminum layer.

* * * * *